United States Patent
Sumiya et al.

(10) Patent No.: US 11,072,008 B2
(45) Date of Patent: Jul. 27, 2021

(54) WEAR-RESISTANT TOOL

(71) Applicants: Sumitomo Electric Industries, Ltd., Osaka (JP); A.L.M.T. Corp., Tokyo (JP)

(72) Inventors: Hitoshi Sumiya, Itami (JP); Takeshi Sato, Itami (JP); Makoto Yukawa, Sumoto (JP); Bunya Suemitsu, Sumoto (JP)

(73) Assignees: Sumitomo Electric Industries, Ltd., Osaka (JP); A.L.M.T. Corp., Tokyo (JP)

( * ) Notice: Subject to any disclaimer, the term of this patent is extended or adjusted under 35 U.S.C. 154(b) by 243 days.

(21) Appl. No.: 15/771,591

(22) PCT Filed: Oct. 19, 2016

(86) PCT No.: PCT/JP2016/080933
§ 371 (c)(1),
(2) Date: Apr. 27, 2018

(87) PCT Pub. No.: WO2017/073424
PCT Pub. Date: May 4, 2017

(65) Prior Publication Data
US 2019/0060968 A1 Feb. 28, 2019

(30) Foreign Application Priority Data
Oct. 30, 2015 (JP) .............................. JP2015-214044

(51) Int. Cl.
*B21C 3/02* (2006.01)
*C01B 32/25* (2017.01)
*C22C 26/00* (2006.01)

(52) U.S. Cl.
CPC .............. *B21C 3/025* (2013.01); *C01B 32/25* (2017.08); *C22C 26/00* (2013.01)

(58) Field of Classification Search
CPC ............ B21C 3/02; B21C 3/025; B21C 1/003
See application file for complete search history.

(56) References Cited

U.S. PATENT DOCUMENTS 3,816,085 A * 6/1974 Hall .......................... B01J 3/062
51/307
4,016,736 A * 4/1977 Garrison .................. B01J 3/062
72/41

(Continued)

FOREIGN PATENT DOCUMENTS

| CN | 101588877 A | 11/2009 |
| CN | 102712478 A | 10/2012 |

(Continued)

OTHER PUBLICATIONS

Notice of Grounds of Rejection issued in correspondin Japanese Patent Application No. 2017-547749 dated Dec. 3, 2019.

(Continued)

*Primary Examiner* — Adam J Eiseman
*Assistant Examiner* — Stephen Floyd London
(74) *Attorney, Agent, or Firm* — Baker Botts L.L.P.; Michael A. Sartori (57) ABSTRACT

A wear-resistant tool includes composite polycrystalline diamond as a core, the composite polycrystalline diamond being composed of polycrystalline diamond in which particulate diamond is directly bonded and non diamond carbon. The polycrystalline diamond in the composite polycrystalline diamond is three-dimensionally continuous in composite polycrystal and primary particles have an average particle size from 10 to 500 nm.

12 Claims, 5 Drawing Sheets

(56) References Cited

U.S. PATENT DOCUMENTS

| | | | | |
|---|---|---|---|---|
| 4,129,052 A | * | 12/1978 | Bieberich | B21C 3/025 72/467 |
| 4,260,397 A | * | 4/1981 | Bovenkerk | B21C 3/025 51/307 |
| 4,374,900 A | * | 2/1983 | Hara | B01J 3/062 419/11 |
| 4,462,242 A | * | 7/1984 | Morgenthaler | B21C 3/025 425/183 |
| 5,377,522 A | * | 1/1995 | Anthony | B21C 3/025 501/86 |
| 5,571,236 A | * | 11/1996 | Takahashi | B21C 3/02 72/467 |
| 5,660,075 A | * | 8/1997 | Johnson | B21C 3/02 72/467 |
| 5,957,005 A | * | 9/1999 | Einset | B21C 3/04 76/107.4 |
| 7,540,181 B1 | * | 6/2009 | Memmott | B21C 3/025 72/274 |
| 2005/0076897 A1 | * | 4/2005 | Yoshida | B21C 3/02 125/39 |
| 2005/0210755 A1 | * | 9/2005 | Cho | B21C 3/025 51/293 |
| 2007/0009374 A1 | * | 1/2007 | Akaishi | C04B 35/52 419/48 |
| 2010/0043520 A1 | * | 2/2010 | Sumiya | B01J 3/062 72/467 |
| 2010/0307069 A1 | * | 12/2010 | Bertagnolli | C22C 26/00 51/309 |
| 2012/0102843 A1 | * | 5/2012 | Chakraborty | C01B 32/28 51/295 |
| 2012/0258035 A1 | | 10/2012 | Sumiya et al. | |
| 2015/0315087 A1 | | 11/2015 | Sato et al. | |
| 2017/0050886 A1 | | 2/2017 | Satoh et al. | |

FOREIGN PATENT DOCUMENTS

| | | |
|---|---|---|
| CN | 104837766 A | 8/2015 |
| CN | 106132906 A | 11/2016 |
| EP | 2127769 A1 | 12/2009 |
| JP | H02-232106 A | 9/1990 |
| JP | 2002-102917 A | 4/2002 |
| JP | 2002102917 A * | 4/2002 ............ B21C 3/025 |
| JP | 2004-196595 A | 7/2004 |
| JP | 2010-149139 A | 7/2010 |
| JP | 2015-209367 A | 11/2015 |
| WO | 2008/088048 A1 | 7/2008 |
| WO | 2015/166730 A1 | 11/2015 |

OTHER PUBLICATIONS

Extended European Search Report dated May 24, 2019 in Application No. EP 16859654.

Office Action in counterpart Chinese Patent Application No. 201680063650.8, dated Dec. 27, 2018, 6 pages.

English Translation of Office Action in counterpart Chinese Patent Application No. 201680063650.8, dated Dec. 27, 2018, 8 pages.

Sumiya et al., "High Pressure Synthesis of High-Purity Polycrystalline Diamonds by Direct Conversion from Various Carbon Materials and their Characterization," The Review of High Pressure Science & Technology, vol. 16, No. 3 (2006).

Notification of the Second Office Action issued in counterpart Chinese Application No. 201680063650.8 dated Aug. 14, 2019.

Yueqing Song et al., "Manual of Synthetic Diamond Tools," Metallurgical Industry Press, Jan. 31, 2014, p. 347. [Cited in Notification of the Second Office Action issued in counterpart Chinese Application No. 201680063650.8 dated Aug. 14, 2019].

Changshi Tang, "High Alloy Steel Wire," Metallurgical Industry Press, May 31, 2008, pp. 339-340. [Cited in Notification of the Second Office Action issued in counterpart Chinese Application No. 201680063650.8 dated Aug. 14, 2019].

H. Sumiya et al., "Microstructure and Mechanical Properties of High-Hardness Nano-Polycrystalline Diamonds," SEI Technical Review, No. 66, Apr. 2008, pp. 85-92.

* cited by examiner

FIG.7A
PRESENT DISCLOSURE

FIG.7B
COMPARATIVE EXAMPLE 1

FIG.7C
COMPARATIVE EXAMPLE 2

FIG.7D
COMPARATIVE EXAMPLE 3

FIG.7E
COMPARATIVE EXAMPLE 4

WEAR-RESISTANT TOOL

The present application claims priority to Japanese Patent Application No. 2015-214044 filed on Oct. 30, 2015, the entire contents of which are incorporated herein by reference.

TECHNICAL FIELD

The present invention relates to a wear-resistant tool.

BACKGROUND ART

A conventional wear-resistant tool is described in documents below.

CITATION LIST

Patent Document

PTD 1: Japanese Patent Laying-Open No. 2-232106
PTD 2: Japanese Patent Laying-Open No. 2004-196595
PTD 3: International Publication WO2008/088048

SUMMARY OF INVENTION

A wear-resistant tool according to one embodiment of the present disclosure is a wear-resistant tool including composite polycrystalline diamond as a core, the composite polycrystalline diamond being composed of polycrystalline diamond in which particulate diamond is directly bonded and non diamond carbon.

DETAILED DESCRIPTION

Figure 1:
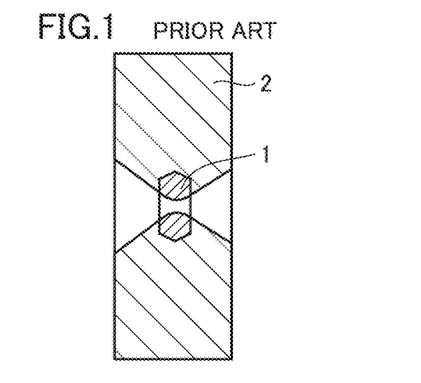
FIG. 1 is a schematic diagram of a cross-section of a wire drawing die containing conventional single crystal diamond.
Figure 2A:
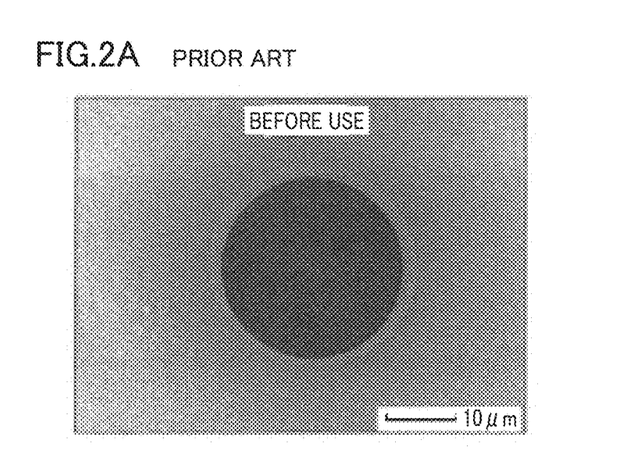
FIG. 2A shows a photograph of a state before wear of the wire drawing die containing conventional single crystal diamond.
Figure 2B:
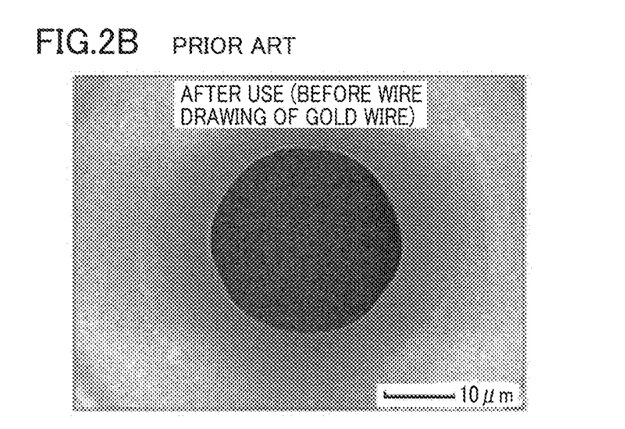
FIG. 2B shows a photograph of a state after wear of the wire drawing die containing conventional single crystal diamond.

A wire drawing die having a profile as in FIG. 1 composed of natural or synthesized single crystal diamond or polycrystalline diamond such as sintered diamond or CVD diamond has conventionally been employed as a wire drawing die which represents one of wear-resistant tools for wire drawing of wires of various diameters such as an extremely thin wire having a diameter not greater than 50 μm or a wire having a large diameter not smaller than 1 mm. Single crystal diamond, however, suffers from uneven wear as in FIG. 2B as being affected by a crystal orientation after wire drawing for a long period of time, which results in disadvantageous degradation of circularity and surface roughness of a wire drawn wire. Single crystal diamond is different in interval between crystal lattice planes depending on an orientation and different in in-plane density of atoms for each lattice plane. Therefore, wear resistance is significantly direction-dependent, uneven wear is caused after wire drawing, and circularity or surface roughness is degraded.

A die for drawing a wire having high hardness such as a stainless steel wire and a steel cord suffers from a crack due to cleavage as a result of application of an excessive stress to the die during wire drawing. Therefore, currently, polycrystalline diamond is generally used for such applications.

Polycrystalline diamond, on the other hand, tends to lead to a rough inner surface of a die, and it is low in thermal conductivity and hence its lubrication effect tends to be low. Thus, a wire tends to break or a surface of a wire tends to be flawed.

An iron group metal such as Co, Ni, or Fe or ceramics such as SiC is contained as a sintering aid or a binder in polycrystalline diamond currently commercially available for a tool. Such polycrystalline diamond is obtained by sintering powders of diamond together with a sintering aid or a binder under a high-pressure and high-temperature condition in which diamond is thermodynamically stable (normally, a pressure from 5 to 6 GPa and a temperature from 1300 to 1500° C.). Since polycrystalline diamond contains approximately 10 volume % of a sintering aid or a binder, a hole having a highly precise profile or having satisfactory surface roughness is not obtained, and polycrystalline diamond is not applicable to wire drawing of a wire required to have circularity and surface roughness. Naturally produced polycrystalline diamond (carbonado or ballas) has also been known and some are used for an excavation bit. Such polycrystalline diamond, however, has coarse particles and also many defects, and it is also highly varied in quality. Therefore, the polycrystalline diamond is not used for applications of a die.

Japanese Patent Laying-Open No. 2-232106 (PTD 1) discloses polycrystalline diamond for other tools, the polycrystalline diamond having a thickness not smaller than 50 μm, an average crystal grain size not greater than 50 μm, a peak ratio (Y/X) between diamond carbon (X) and non-diamond carbon (Y) found in Raman spectroscopic analysis not higher than 0.2, and a specific resistance not lower than 107 Ω·cm. Wear due to microfracture or coming-off of particles is prevented by obtaining high-purity polycrystalline diamond by significantly decreasing non-diamond carbon.

Japanese Patent Laying-Open No. 2004-196595 (PTD 2) discloses a heat-resistant diamond composite sintered material having a Vickers hardness not lower than 85 GPa, the heat-resistant diamond composite sintered material being composed of a sintered material of ultrafine synthesized diamond powders having an average particle size not greater than 200 nm, the sintered material being a composite sintered material composed of diamond crystals and a trace amount of generated non-diamond carbon which is sintered in an ultra-high pressure apparatus with a static compression method without using a sintering aid. With the starting materials and the manufacturing method above, diamond particles are readily plastically deformed. By using high surface energy intrinsic to small diamond particles as driving power, the heat resistant diamond composite sintered material is obtained without using any sintering aid. Since the heat resistant diamond composite sintered material contains a trace amount of non-diamond carbon, it is provided with electrical conductivity and can be used for electrical discharge machining.

International Publication WO2008/088048 (PTD 3) discloses a wire drawing die containing polycrystalline diamond consisting substantially of diamond as a core, the polycrystalline diamond being obtained by employing a non-diamond type carbon material as a starting material and directly converting by sintering the carbon material to diamond without addition of a sintering aid or a catalyst at an ultra-high pressure and temperature. The polycrystalline diamond has a mixed structure of fine diamond having a maximum particle size not greater than 100 nm and an average particle size not greater than 50 nm and plate-like or particulate coarse diamond having a minimum particle size not smaller than 50 nm and a maximum particle size not greater than 10000 nm. The polycrystalline diamond is provided with a hole through which a wire to be wire drawn is drawn. The wire drawing die made of such polycrystalline diamond can be high in wear resistance and less in uneven wear or a fracture due to cleavage, and hence can have durability at least three times as high as a conventional material.

When such conventional diamond is used for a wear-resistant tool such as a die or a nozzle or a cutting tool, however, a problem as below arises.

A wear-resistant tool containing single crystal diamond suffers from uneven wear.

Examples of polycrystalline diamond include sintered diamond containing a group 4 to 6 transition metal such as Co as a binder, sintered diamond containing ceramics such as SiC as a binder, or polycrystalline CVD diamond. A wear-resistant tool containing such diamond brings about coarse surface roughness of an object machined therewith. Examples of the wear-resistant tool include a wire drawing die. In order to suppress wear of a wire drawing die or improve surface roughness of a machined wire, a reduction angle may be made smaller or a bearing length may be increased. By doing so, however, a wire is broken. The present disclosure solves also the problem of break, and provides a high-quality wear-resistant tool which achieves suppressed wear of a tool by making a reduction angle smaller or making a bearing longer, achieves a longer lifetime of a tool by suppressing variation in hole diameter or variation in circularity, and is less likely to bring about break.

Though diamond in PTD 3 is polycrystalline, a particle size of the diamond is small. Therefore, though it can solve the problem of surface roughness, it is expensive.

Such polycrystalline diamond is low in thermal conductivity and hence it is also disadvantageous in its poor lubrication. When the diamond is used for other wear-resistant tools, a similar problem also arises.

The present disclosure was made to solve the problems of the conventional art above, and provides a wear-resistant tool high in wear resistance.

A wear-resistant tool according to one embodiment of the present disclosure includes composite polycrystalline diamond as a core, the composite polycrystalline diamond being composed of polycrystalline diamond in which particulate diamond is directly bonded and non diamond carbon. The composite polycrystalline diamond is a composite sintered material composed of diamond directly converted by sintering to diamond from a non-diamond type carbon material as a starting material without addition of a sintering aid or a catalyst at an ultra-high pressure and temperature and non-diamond which has not been converted or is being converted.

Description of Embodiment of the Invention of the Present Application

Embodiments of the invention of the present application will initially be listed and described.

The invention of the present application relates to a wear-resistant tool such as a wire drawing die for wire drawing of a wire or a nozzle.

Preferably, the polycrystalline diamond in the composite polycrystalline diamond is three-dimensionally continuous in composite polycrystal and primary particles have an average particle size from 10 to 500 nm. The average particle size in the present application is found as below. Initially, a sintered material structure of polycrystalline diamond is observed with an SEM or a TEM. Individual particles (primary particles) are extracted through image processing and an area of the particle is calculated. A diameter with the area being assumed as the area of a circle is defined as a particle size. An average value of particle sizes of the particles per a unit area (for example, 50 μm×50 μm) is defined as an average particle size.

Preferably, a ratio of the non diamond carbon in the entire composite polycrystalline diamond is equal to or higher than 0.05% in volume ratio. The ratio is more preferably from 0.05 to 40%, further preferably from 0.05 to 20%, and further preferably from 1 to 15%. The numeric value is calculated as "a volume of non diamond carbon)/(a volume of non-diamond carbon+a volume of polycrystalline diamond). A ratio between a volume of non diamond carbon and a volume of polycrystalline diamond is calculated in an expression below, by finding each volume with an X-ray diffraction method.

(Volume of non diamond carbon)/(volume of non diamond carbon+volume of polycrystalline diamond)

Preferably, the non diamond carbon in the composite polycrystalline diamond is graphite-like carbon.

Preferably, the non diamond carbon in the composite polycrystalline diamond is compressed graphite.

Preferably, in the wear-resistant tool containing the composite polycrystalline diamond as the core, the non diamond carbon is dispersed in a surface thereof which functions for machining and a ratio (an area of non diamond carbon/an area of the surface which functions for machining) is equal to or higher than 0.05%. The ratio is more preferably from 0.05 to 40% and further preferably from 0.05 to 20%. The ratio of a non-diamond portion is calculated in an expression below, by observing a sintered material structure of polycrystalline diamond with an SEM and distinguishing a diamond portion and the non-diamond portion from each other through image processing (binary processing) in an SEM image of the structure.

(Area of non diamond carbon)/(area of non diamond carbon+area of polycrystalline diamond)

Preferably, a hole is provided in the composite polycrystalline diamond, a surface which functions for machining is formed in the hole, and the surface which functions for machining has surface roughness Sa not smaller than 1 nm and not greater than 300 nm. Preferably, a bearing portion of a hole provided in the composite polycrystalline diamond has circularity not greater than 0.2 μm. The circularity in the present application refers to a difference between a maximum diameter and a minimum diameter in measurement of a diameter of a wire which is drawn through a die in each direction around 360°. Surface roughness Sa is defined under ISO 25178.

Preferably, a reduction angle of a hole profile is from 3 to 20°. Depending on a type of a wire, more preferably, the reduction angle is from 7 to 15° in wire drawing of a gold wire, from 7 to 15° in wire drawing of a copper wire, from 6 to 13° in wire drawing of a tungsten wire, from 6 to 13° in wire drawing of a stainless steel wire, and from 6 to 13° in wire drawing of a steel cord.

Preferably, a length of a bearing portion is not smaller than 0.2 D and not greater than 1.0 D where D represents a diameter of the bearing portion.

When the diameter is smaller than 0.2 D, machining of a wire may be insufficient and hence the diameter is set to 0.2 D or greater. When the diameter exceeds 1.0 D, break of a wire is likely, and supply of a lubricant to a bearing is insufficient and consequently a wire may be flawed or wear of a bearing portion may be accelerated. Therefore, the diameter is set to 1.0 D or smaller. "May be" means the possibility albeit only slight and does not mean high probability.

Such a wire drawing die is preferably used with an area reduction ratio thereof being set to 10 to 30%.

According to the wear-resistant tool, circularity of a hole is less likely to degrade and good circularity can be maintained for a long time. Presence of non diamond carbon such as graphite-like carbon and impregnation of the non diamond carbon with a lubricant improves lubrication and lowers resistance during machining.

Details of Embodiment of the Invention of the Present Application

When non diamond carbon as a starting material is sintered at 100,000 atmospheric pressures at a temperature not lower than 2000° C., a composite polycrystalline diamond sintered material having such a structure that relatively coarse non diamond carbon having an average particle size, for example, of 600 nm is dispersed in a matrix of very fine particulate diamond having an average particle size, for example, of 400 nm is obtained.

Preferably, the particulate diamond has an average particle size not greater than 1000 nm and non diamond carbon has an average particle size not greater than 2000 nm. An average particle size exceeding this range may lead particularly to degradation of wear resistance or chipping resistance in a non diamond carbon portion. From a point of view of enhancement of wear resistance or chipping resistance, preferably, the particulate diamond has an average particle size not greater than 500 nm and non diamond carbon has an average particle size not greater than 700 nm.

A capsule made of a metal such as Mo is filled with non diamond carbon as a starting material. When crushed fine carbon is used, an operation for filling should be performed in a high-purity inert gas. An ultra-high pressure and temperature generation apparatus which can apply an isotropic pressure or a hydrostatic pressure such as a multi-anvil type ultra-high pressure apparatus or a belt-type ultra-high pressure apparatus is used to hold the capsule for a prescribed period of time at a temperature not lower than 2000° C. and at 100,000 atmospheric pressures. Some of non diamond carbon is directly converted to particulate diamond and simultaneously sintered. A composite polycrystalline diamond sintered material in which particulate diamond has an average particle size not greater than 1000 nm and non diamond carbon has an average particle size not greater than 2000 nm is thus obtained.

The composite polycrystalline diamond sintered material having such a structure that non diamond carbon is dispersed in a matrix of particulate diamond is thus obtained in a stable manner.

A composite polycrystalline diamond sintered material having a similar structure is obtained also by setting a rate of heating to 100 to 1000° C./minute in high-pressure and high-temperature treatment above by using graphite as a starting material.

As a result of an effect of combination of particulate diamond having an average particle size not greater than 1000 nm and non diamond carbon having an average particle size not greater than 2000 nm, wear resistance and chipping resistance are improved and variation in characteristics is also less.

With the composite polycrystalline diamond being employed as a core, a hole is provided therein by using laser and a surface of the hole is polished. Surface roughness Sa of the polished surface of the hole is not smaller than 1 nm and not greater than 300 nm. With such surface roughness, resistance in wire drawing through a wire drawing die is suppressed during wire drawing and an amount of wear of the wire drawing die is also small, so that a lifetime of the wire drawing die is improved. In addition, in spite of the wire drawing die being made of polycrystalline diamond high in wear resistance, polishing thereof is relatively easy and machining thereof can be performed in a short period of time.

As a result of machining through such laser machining and polishing such that the hole has circularity not greater than 0.2 μm in observation of a cross-section of a bearing portion, a wire high in precision and high in quality is obtained and a die having a long lifetime can be obtained.

Example 1

Figure 3:
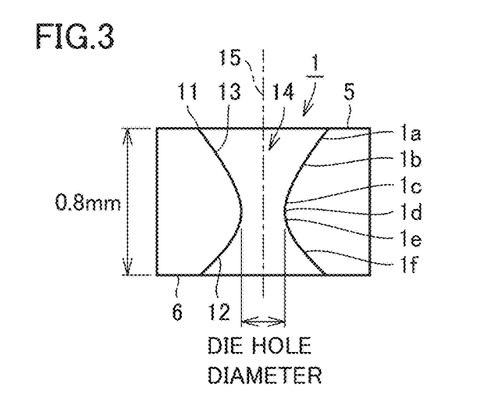
FIG. 3 is a diagram showing a schematic profile of a wire drawing die in the present disclosure employed in an Example and a wire drawing die in a Comparative Example.

FIG. 3 is a diagram showing a schematic profile of a wire drawing die in the present disclosure employed in an Example and a wire drawing die in a Comparative Example. Referring to FIG. 3, diamond 1 has an entrance 11 and an exit 12 and is provided with a hole 14 extending from entrance 11 to exit 12. Diamond 1 has a bell portion 1a, an approach portion 1b, a reduction portion 1c, a bearing portion 1d, a back relief portion 1e, and an exit portion 1f from a side of entrance 11. By providing hole 14 in diamond 1, a wire is inserted from the side of entrance 11 and pulled out toward exit 12.

An inclination of a sidewall 13 gradually varies with respect to an axis 15 defined as a central axis. In the cross-section shown in FIG. 3, hole 14 is constructed to be symmetric with respect to axis 15. The hole has a diameter decreased toward bearing portion 1d. The inclination of sidewall 13 defining hole 14 is smaller toward bearing portion 1d and an angle formed between sidewall 13 and axis 15 is smaller toward bearing portion 1d. A curved surface defining a boundary between bearing portion 1d and reduction portion 1c is defined by a combination of smooth curves. An inner diameter of hole 14 at bearing portion 1d is denoted as D. Back relief portion 1e continuous to bearing portion 1d, where a diameter of the hole is increased, is provided, and exit portion 1f defined by a curve is provided on the side of exit 12.

Diamond 1 is provided with a first surface 5 perpendicular to axis 15 on the side of entrance 11 and with a second surface 6 perpendicular to axis 15 on the side of exit 12. An opening angle (a reduction angle) of reduction portion 1c is preferably from 3 to 20°. Bearing portion 1d has a length preferably not smaller than 0.2 D and not greater than 1.0 D.

The wire drawing die is employed as an exemplary wear-resistant tool. An Mo capsule was filled with highly crystalline graphite powders having a particle size from 0.05 to 10 μm and a purity not lower than 99.95% as a diamond material to be used for the wire drawing die, and the capsule was hermitically sealed. The capsule was treated for 30 minutes under various pressure and temperature conditions with the use of an ultra-high pressure generation apparatus. A generated phase of an obtained sample was identified through X-ray diffraction and a particle size of constituent particles was examined through observation with an SEM.

TABLE 1

|  | Sample 1 | Sample 2 | Sample 3 |
|---|---|---|---|
| Temperature (° C.) | 2400 | 2200 | 2300 |
| Pressure (GPa) | 11 | 14 | 13 |
| Ratio of Non-Diamond Carbon Phase (Volume %) | 35 | 0.5 | 15 |
| Average Particle Size of Diamond (nm) | 450 | 50 | 150 |
| Average Particle Size of Non-Diamond Carbon (nm) | 1500 | 100 | 650 |
| Knoop Hardness (GPa) | 55 | 95 | 75 |

Based on results, a composite polycrystalline diamond sintered material having such a structure that non diamond carbon having an average particle size not greater than 2000 nm is dispersed in a matrix of particulate diamond having an average particle size not greater than 1000 nm is obtained in a stable manner.

A wire drawing die in the present disclosure containing the diamond above and wire drawing dies containing conventional various diamond materials were manufactured and a wire drawing test was conducted. Polycrystalline diamond as sample 3 shown in Table 1 among the diamond materials is employed as a diamond material to be used for the wire drawing die in the present disclosure. Four types which are ultrafine binderless sintered diamond (Comparative Example 1) described in PTD 3, sintered diamond having an average particle size of 1 μm (Comparative Example 2), sintered diamond having an average particle size of 1 μm from which a binder has been removed (Comparative Example 3), and high-pressure synthesized single crystal diamond (Comparative Example 4) are employed as diamond materials to be used for the wire drawing dies in the Comparative Examples.

Regarding a hole profile of the die before wire drawing in each of the present disclosure and Comparative Examples 1 to 4, a hole diameter (a bearing diameter D) is set to 80 μm, circularity of the bearing portion is not greater than 0.2 μm, a length of the bearing portion is 0.3 D, a reduction angle (an opening angle at reduction portion 1c) is from 10 to 12°, and a surface which functions for machining has surface roughness Sa of 14 nm.

Regarding a test condition, wire drawing was performed with a stainless steel wire (SUS304) having a diameter of 86.6 μm being employed as a wire to be wire drawn and with an area reduction ratio being set to 14%. Since the five types of dies are slightly different in initial hole diameter from one another, a stainless steel wire having a diameter greater by approximately 6 μm than the initial hole diameter is employed as a wire to be wire drawn.

Figure 4:
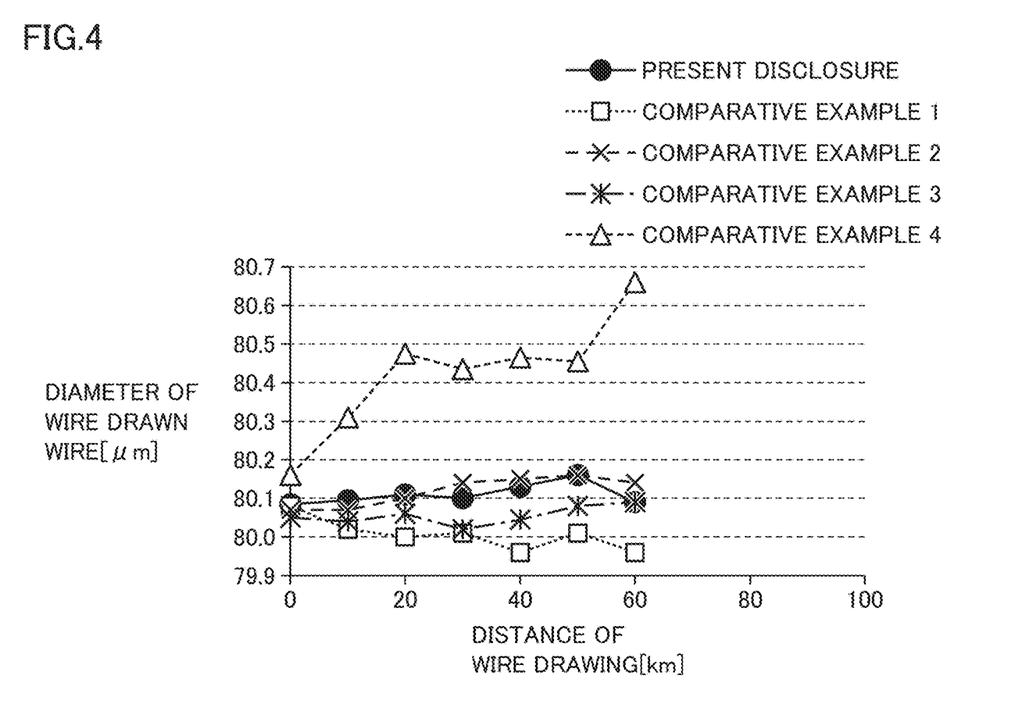
FIG. 4 shows a graph showing a state of variation in diameter of a wire drawn wire with respect to a distance of wire drawing when the wire drawing die in the present disclosure and the wire drawing dies in Comparative Examples are used for wire drawing.
Figure 5:
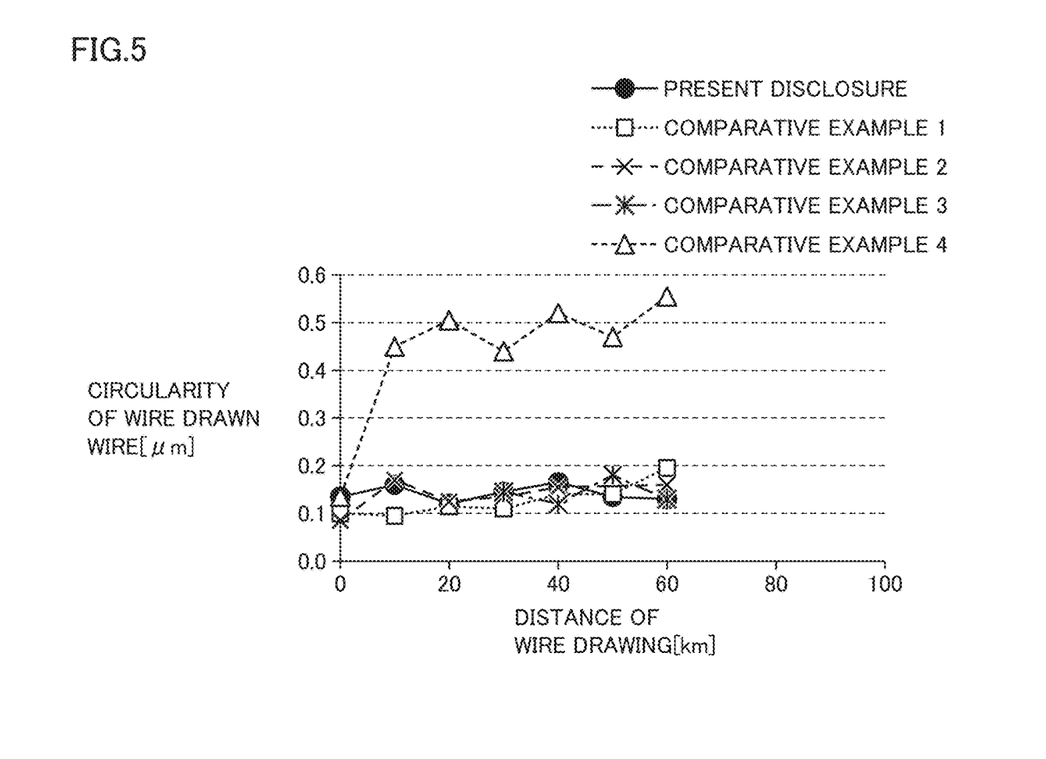
FIG. 5 shows a graph showing a state of variation in circularity of a wire drawn wire with respect to a distance of wire drawing when the wire drawing die in the present disclosure and the wire drawing dies in Comparative Examples are used for wire drawing.
Figure 6:
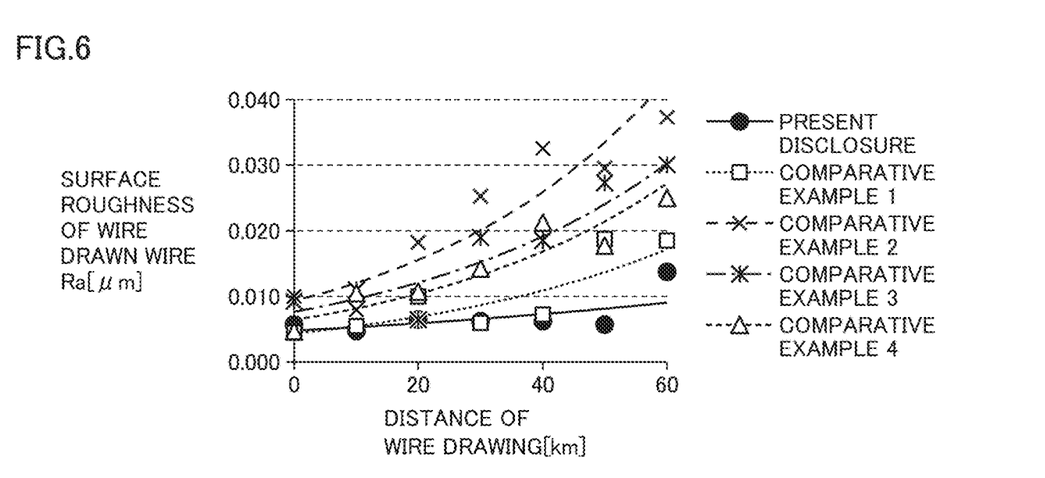
FIG. 6 shows a graph showing a state of variation in surface roughness of a wire drawn wire with respect to a distance of wire drawing when the wire drawing die in the present disclosure and the wire drawing dies in Comparative Examples are used for wire drawing.
Figure 7A:
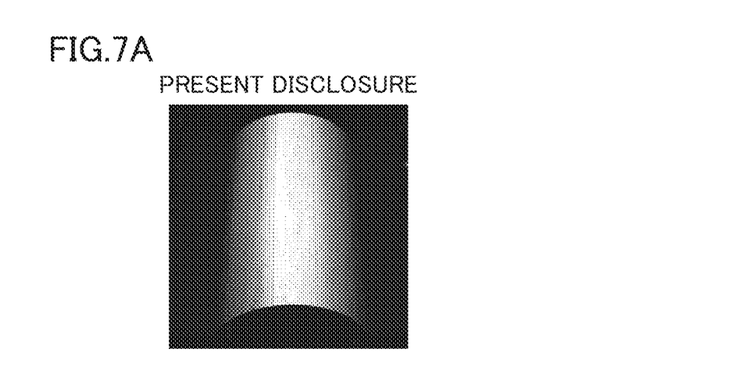
FIG. 7A shows a photograph of a surface of a wire when the wire drawing die in the present disclosure is used for wire drawing over a distance of wire drawing of 60 km.
Figure 7B:
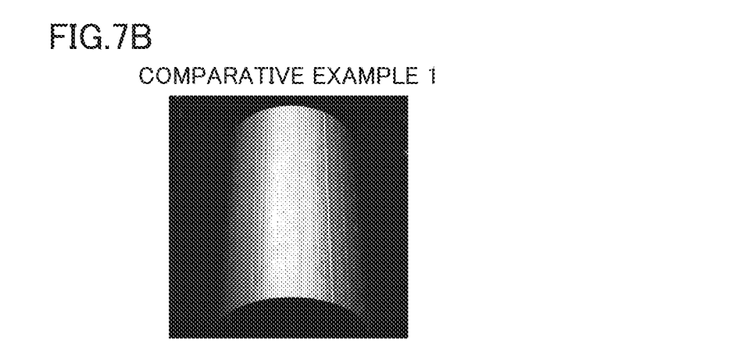
FIG. 7B shows a photograph of a surface of a wire when a wire drawing die in Comparative Example 1 is used for wire drawing over a distance of wire drawing of 60 km.
Figure 7C:
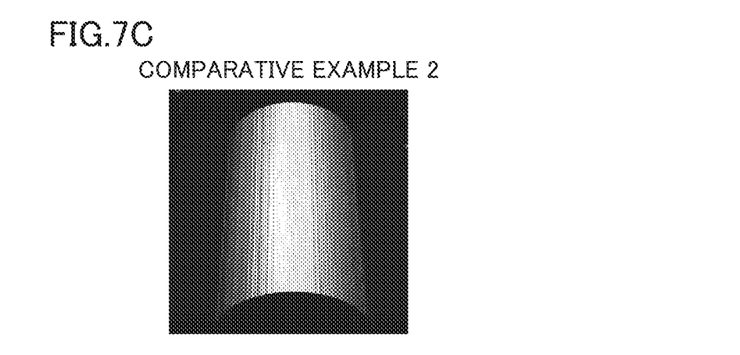
FIG. 7C shows a photograph of a surface of a wire when a wire drawing die in Comparative Example 2 is used for wire drawing over a distance of wire drawing of 60 km.
Figure 7D:
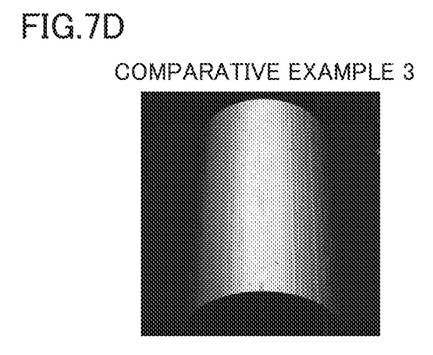
FIG. 7D shows a photograph of a surface of a wire when a wire drawing die in Comparative Example 3 is used for wire drawing over a distance of wire drawing of 60 km.
Figure 7E:
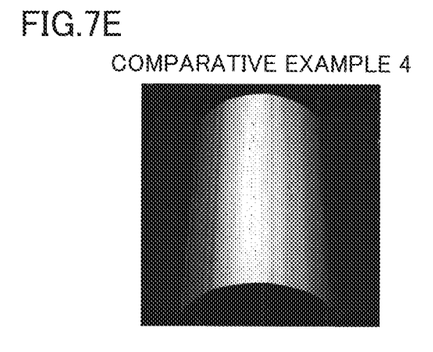
FIG. 7E shows a photograph of a surface of a wire when a wire drawing die in Comparative Example 4 is used for wire drawing over a distance of wire drawing of 60 km.

A diameter of the wire drawn wire was measured with a method below, and with that diameter being defined as a die hole diameter, variation in diameter was observed. A difference between a maximum diameter and a minimum diameter obtained in measurement of a diameter of the wire drawn through the die in each direction around 360° was defined as circularity. In the method of measuring a diameter of the wire drawn wire, a wire diameter measurement instrument (LDSN) manufactured by CERSA was used, wire drawing was interrupted each time wire drawing by 1 km was performed, and a diameter of the wire drawn wire was measured at 250 points around 360°. An average value of measurement values obtained at the 250 points was defined as a die hole diameter and a difference between a maximum value and a minimum value was calculated as circularity. FIGS. 4 and 5 show graphs obtained by plotting these numeric values. Surface roughness of the wire was measured in a circumferential direction over a surface of the wire with a surface roughness measurement instrument. A length subjected to measurement was set to 40 μm, and FIG. 6 shows a graph obtained by plotting measurement values. A curve in the graph is an approximation curve based on a least square method.

The graph in FIG. 4 shows variation in die hole diameter with respect to a distance of wire drawing and the graph in FIG. 5 shows variation in circularity of a die hole with respect to a distance of wire drawing. Based on results, the wire drawing die in Comparative Example 4 is at least three times as high in rate of variation in hole diameter as the wire drawing die in the present disclosure, and Comparative Examples 1 to 3 are close in rate of variation in hole diameter to the present disclosure. Circularity of the wire drawing die in each of the present disclosure and Comparative Examples 1 to 3 was hardly varied, whereas circularity of the wire drawing die in Comparative Example 4 was significantly varied. It could be confirmed that the die in the present disclosure was excellent in durability than the conventional wire drawing die containing high-pressure synthesized single crystal diamond.

The graph in FIG. 6 shows variation in surface roughness of a wire with respect to a distance of wire drawing and FIGS. 7A to 7E each show a photograph of a surface of a wire drawn wire at a time point when the distance of wire drawing was 60 km. It was found that the wire drawing die in the present disclosure was better than the wire drawing dies in Comparative Examples because surface roughness of the wire was less likely to degrade even after wire drawing was continued.

It can be seen in the results above that, based on a difference in variation in diameter, circularity, and surface roughness of a wire as a result of wire drawing, the wire drawing die in the present disclosure is better in wear resistance, quality of the wire, and cost than the conventional wire drawing dies, and it is inexpensive and less also in variation in circularity so that highly precise wire drawing of high quality can be performed therewith for a long period of time.

Example 2

In Example 2, a die having each sample number in Table 2 was used and evaluated based on variation of a hole (a hole diameter and circularity), surface roughness of a wire drawn wire, and a condition of occurrence of break.

A wire drawn wire was made of SUS304 having a diameter of ϕ 86.6 μm, a diameter of a die hole was set to ϕ 80.2 μm, a reduction angle (an opening angle) was set to 8°, a bearing length was set to 1.0 D, an area reduction ratio was set to 14%, a rate of wire drawing was set to 600 m/min., and no lubricant was used. Table 2 shows results.

TABLE 2

| Sample Number | Characteristics of Diamond Die | Result (Wire Drawing by 60 km Being Evaluated with Index) | | | | |
|---|---|---|---|---|---|---|
| | | Variation in Hole Diameter | Variation in Circularity | Surface Roughness of Wire | Condition of Break | Remarks |
| 11 | Containing polycrystalline diamond in which particulate diamond having particle size of 100 nm is directly bonded and 10 vol % of compressed graphite as non diamond carbon | 100 | 100 | 100 | A | |
| 12 | PCD (Catalyst Remaining Between Particulate Diamond) | 263 | 111 | 474 | C | Comparative Example |
| 13 | High-Pressure Synthesized Single Crystal Diamond | 716 | 417 | 284 | B | Comparative Example |
| 14 | Consisting of Polycrystalline Diamond, Without Containing Non Diamond Carbon | 73 | 96 | 106 | C | Comparative Example |

A "condition of break" was evaluated as A when a wire was not broken during wire drawing by 60 km, as B when a wire was broken once or twice during wire drawing by 60 km, and as C when a wire was broken three times or more during wire drawing by 60 km, which is also applicable to other Examples.

It was found that a diamond die having a sample number 11 achieved excellent performance.

Example 3

In Example 3, a die having each sample number in Table 3 was used and evaluated based on variation of a hole (a hole diameter and circularity), surface roughness of a wire drawn wire, and a condition of occurrence of break. Sample numbers 21 to 25 include composite polycrystalline diamond as a core, the composite polycrystalline diamond containing polycrystalline diamond in which particulate diamond is directly bonded and compressed graphite as non diamond carbon. Table 3 shows an average particle size of primary particles of diamond.

A wire drawn wire was made of SUS304 having a diameter of ϕ 86.6 μm, a diameter of a die hole was set to ϕ 80.2 μm, a reduction angle (an opening angle) was set to 8°, a bearing length was set to 1.0 D, an area reduction ratio was set to 14%, and a rate of wire drawing was set to 1000 m/min. Example 3 and subsequent Examples adopted conditions of a rate of wire drawing severer than Example 2. No lubricant was used. Table 3 shows results.

TABLE 3

| Sample Number | Average Particle Size of Primary Particles (nm) | Result (Wire Drawing by 60 km Being Evaluated with Index) | | | | Remarks |
|---|---|---|---|---|---|---|
| | | Variation in Hole Diameter | Variation in Circularity | Surface Roughness of Wire | Condition of Break | |
| 21 | 10 nm | 74 | 99 | 108 | A | |
| 22 | 500 nm | 126 | 108 | 108 | A | |
| 23 | 250 nm | 100 | 100 | 100 | A | |
| 24 | 8 nm | 68 | 98 | 106 | B | |
| 25 | 600 nm | 133 | 110 | 111 | A | |
| 26 | Consisting of Polycrystalline Diamond Without Containing Non Diamond Carbon | 70 | 96 | 110 | C | Comparative Example |

It was found in Table 3 that, with an average particle size of the primary particles being set to 10 to 250 nm, excellent results were obtained even under severe wire drawing conditions.

Example 4

In Example 4, a die having each sample number in Table 4 was used and evaluated based on variation of a hole (a hole diameter and circularity), surface roughness of a wire drawn wire, and a condition of occurrence of break. Sample numbers 31 to 35 include composite polycrystalline diamond as a core, the composite polycrystalline diamond containing polycrystalline diamond in which particulate diamond is directly bonded and compressed graphite as non diamond carbon at a volume ratio shown in Table 4.

A wire drawn wire was made of SUS304 having a diameter of ϕ 86.6 μm. A diameter of a die hole was set to ϕ 80.2 μm, a reduction angle (an opening angle) was set to 8°, a bearing length was set to 1.0 D, an area reduction ratio was set to 14%, a rate of wire drawing was set to 1000 m/min., and no lubricant was used. Table 4 shows results.

TABLE 4

| Sample Number | Volume Ratio of Compressed Graphite | Result (Wire Drawing by 60 km Being Evaluated with Index) | | | | Remarks |
|---|---|---|---|---|---|---|
| | | Variation in Hole Diameter | Variation in Circularity | Surface Roughness of Wire | Condition of Break | |
| 31 | 0.03% | 77 | 96 | 110 | B | |
| 32 | 0.05% | 69 | 97 | 106 | A | |
| 33 | 1% | 86 | 99 | 103 | A | |
| 34 | 15% | 100 | 100 | 100 | A | |
| 35 | 20% | 101 | 104 | 105 | A | |
| 36 | Consisting of Polycrystalline Diamond Without Containing Non Diamond Carbon | 70 | 96 | 110 | C | Comparative Example |

It was found in Table 4 that, with a ratio of compressed graphite being set to 0.05 to 20%, excellent results were obtained even under severe wire drawing conditions.

Example 5

In Example 5, a die having each sample number in Table 5 was used and evaluated based on variation of a hole (a hole diameter and circularity), surface roughness of a wire drawn wire, and a condition of occurrence of break. Sample numbers 41 to 45 include composite polycrystalline diamond as a core, the composite polycrystalline diamond containing polycrystalline diamond in which particulate diamond is directly bonded and compressed graphite as non diamond carbon. Table 5 also shows an area ratio of compressed graphite in a bearing portion.

A wire drawn wire was made of SUS304 having a diameter of $\phi$ 86.6 μm. A diameter of a die hole was set to $\phi$ 80.2 μm, a reduction angle (opening angle) was set to 8°, a bearing length was set to 1.0 D, an area reduction ratio was set to 14%, a rate of wire drawing was set to 1000 m/min., and no lubricant was used. Table 5 shows results.

TABLE 5

| | | Result (Wire Drawing by 60 km Being Evaluated with Index) | | | |
| --- | --- | --- | --- | --- | --- |
| Sample Name | Area Ratio of Compressed Graphite (%) | Variation in Hole Diameter | Variation in Circularity | Surface Roughness of Wire | Condition of Break |
| 41 | 0.03 | 78 | 97 | 108 | B |
| 42 | 0.05 | 70 | 98 | 105 | A |
| 43 | 5 | 100 | 100 | 100 | A |
| 44 | 20 | 103 | 106 | 105 | A |
| 45 | 30 | 113 | 109 | 111 | A |

It was found in Table 5 that an area of compressed graphite was preferably not lower than 0.05% and further preferably from 0.05% to 20%.

Example 6

In Example 6, a die having each sample number in Table 6 was used and evaluated based on variation of a hole (a hole diameter and circularity) and a condition of occurrence of break. Sample numbers 51 to 58 include composite polycrystalline diamond as a core, the composite polycrystalline diamond containing polycrystalline diamond in which particulate diamond is directly bonded and 10 vol % of compressed graphite as non diamond carbon. A wire drawn wire was made of SUS304 having a diameter of $\phi$ 86.6 μm. A diameter of a die hole was set to $\phi$ 80.2 μm, a bearing length was set to 1.0 D, an area reduction ratio was set to 14%, a rate of wire drawing was set to 1000 m/min., and no lubricant was used. Table 6 shows results.

TABLE 6

| | | Result (Wire Drawing by 60 km Being Evaluated with Index) | |
| --- | --- | --- | --- |
| Sample Name | Reduction Angle (°) | Variation in Hole Diameter | Condition of Break |
| 51 | 2 | 74 | B |
| 52 | 3 | 79 | A |
| 53 | 7 | 90 | A |
| 54 | 8 | 100 | A |

TABLE 6-continued

| | | Result (Wire Drawing by 60 km Being Evaluated with Index) | |
| --- | --- | --- | --- |
| Sample Name | Reduction Angle (°) | Variation in Hole Diameter | Condition of Break |
| 55 | 10 | 102 | A |
| 56 | 14 | 108 | A |
| 57 | 20 | 116 | A |
| 58 | 22 | 132 | B |

It was found in Table 6 that a reduction angle was preferably from 3 to 20°.

Example 7

In Example 7, a die having each sample number in Table 7 was used and evaluated based on variation of a hole (a hole diameter and circularity), surface roughness of a wire drawn wire, and a condition of occurrence of break. Sample numbers 61 to 65 include composite polycrystalline diamond as a core, the composite polycrystalline diamond containing polycrystalline diamond in which particulate diamond is directly bonded and 10 vol % of compressed graphite as non diamond carbon. A wire drawn wire was made of SUS304 having a diameter of $\phi$ 86.6 μm. A diameter of a die hole was set to $\phi$ 80.2 μm, a reduction angle (an opening angle) was set to 8°, an area reduction ratio was set to 14%, a rate of wire drawing was set to 1000 m/min., and no lubricant was used. Table 7 shows results.

TABLE 7

| | | Result (Wire Drawing by 60 km Being Evaluated with Index) | | | |
| --- | --- | --- | --- | --- | --- |
| Sample Name | Bearing Length | Variation in Hole Diameter | Variation in Circularity | Surface Roughness of Wire | Condition of Break |
| 61 | 0.1D | 122 | 107 | 104 | A |
| 62 | 0.2D | 110 | 105 | 103 | A |
| 63 | 0.6D | 100 | 100 | 100 | A |
| 64 | 1.0D | 94 | 97 | 98 | A |
| 65 | 1.2D | 89 | 96 | 96 | B |

It was found in Table 7 that a bearing length was preferably from 0.2 D to 1.0 D.

It can be seen that a wear-resistant tool which is excellent in circularity and can prevent uneven wear can be provided. Such a wear-resistant tool contains a firm polycrystalline diamond material manufactured with direct bonding and contains graphite, and it is also excellent in lubrication.

Though an embodiment of this invention has been described above, the embodiment shown here can variously be modified. The wear-resistant tool according to the present disclosure can be used not only for a wire drawing die but also for a compacting die, a shaving die (which shaves a surface of a wire with an internal blade of diamond in an intermediate process of wire drawing severe for a surface state), a tin-plating die (a titanium material being used for a case in order to press sticking of tin slag to the case), a cross head (used for a synthesized clad resin for a point copper wire), a water jet nozzle, a wire cutting tool, a ceramic round rod push-out nozzle, a mechanical pencil lead, a spray drier nozzle, and a hydraulic die. In a wire drawing die, various shapes such as an annular shape, a quadrangular shape, a track shape (a shape similar to a running track defined by a pair of parallel straight lines and a pair of opposing arcs connecting end portions of the straight lines), a ribbon shape, and a hexagonal shape can be adopted as a shape of a hole.

It should be understood that the embodiment disclosed herein is illustrative and non-restrictive in every respect. The scope of the present invention is defined by the terms of the claims, rather than the embodiment above, and is intended to include any modifications within the scope and meaning equivalent to the terms of the claims.

REFERENCE SIGNS LIST

1 diamond; 1*a* bell portion; 1*b* approach portion; 1*c* reduction portion; 1*d* bearing portion; 1*e* back relief portion; 1*f* exit portion; 2 case; 11 entrance; 12 exit; 13 sidewall; 14 hole; and 15 axis

The invention claimed is:

1. A wear-resistant tool comprising composite polycrystalline diamond as a core, the composite polycrystalline diamond consisting essentially of polycrystalline diamond and non-diamond carbon, the polycrystalline diamond including a plurality of diamond particulates, and the plurality of diamond particulates are directly bonded to one another, the non-diamond carbon is dispersed in a surface which functions for machining of the wear-resistant tool, and a ratio of an area of non-diamond carbon to an area of the surface which functions for machining is from 0.05% to 30%.

2. The wear-resistant tool according to claim 1, wherein the polycrystalline diamond in the composite polycrystalline diamond is three-dimensionally continuous in composite polycrystal and primary particles have an average particle size from 10 to 500 nm.

3. The wear-resistant tool according to claim 1, wherein a ratio of the non-diamond carbon in the composite polycrystalline diamond is from 0.05% to 20% in volume ratio.

4. The wear-resistant tool according to claim 1, wherein the non-diamond carbon is graphite-like carbon.

5. The wear-resistant tool according to claim 1, wherein the non-diamond carbon in the composite polycrystalline diamond is compressed graphite.

6. The wear-resistant tool according to claim 1, wherein the ratio is from 0.05 to 20%.

7. The wear-resistant tool according to claim 1, wherein a hole is provided in the composite polycrystalline diamond, the surface which functions for machining is formed in the hole, and the surface which functions for machining has surface roughness Sa not smaller than 1 nm and not greater than 300 nm.

8. The wear-resistant tool according to claim 1, the wear-resistant tool being a wire drawing die, wherein
a bearing portion of a hole has circularity not greater than 0.2 μm.

9. The wear-resistant tool according to claim 1, the wear-resistant tool being a wire drawing die, wherein
a reduction angle of a hole profile is from 3 to 20°.

10. The wear-resistant tool according to claim 9, the wear-resistant tool being the wire drawing die, wherein
the reduction angle of the hole profile is from 3 to 10°.

11. The wear-resistant tool according to claim 1, the wear-resistant tool being a wire drawing die, wherein
a length of a bearing portion is not smaller than 0.2D and not greater than 1.0D where D represents a diameter of the bearing portion of a hole profile.

12. The wear-resistant tool according to claim 11, wherein the bearing portion has a length not smaller than 0.6D and not greater than 1.0D.

* * * * *